US011922376B2

(12) United States Patent
Katzer

(10) Patent No.: US 11,922,376 B2
(45) Date of Patent: Mar. 5, 2024

(54) SYSTEMS AND METHODS FOR USING A TRANSACTION TO COLLECT ADDITIONAL TRANSACTION INFORMATION

(71) Applicant: Capital One Services, LLC, McLean, VA (US)

(72) Inventor: Jason Katzer, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/644,222

(22) Filed: Dec. 14, 2021

(65) Prior Publication Data

US 2022/0108278 A1 Apr. 7, 2022

Related U.S. Application Data

(63) Continuation of application No. 16/880,008, filed on May 21, 2020, now Pat. No. 11,227,260.

(51) Int. Cl.
  *G06Q 30/00* (2023.01)
  *G06F 40/289* (2020.01)
  (Continued)

(52) U.S. Cl.
  CPC ......... *G06Q 10/107* (2013.01); *G06F 40/289* (2020.01); *G06Q 30/0185* (2013.01);
  (Continued)

(58) Field of Classification Search
  CPC .............. G06Q 10/107; G06Q 40/289; G06Q 30/0185; G06Q 30/0234; G06Q 40/02; G06Q 20/342; G06Q 20/347
  (Continued)

(56) References Cited

U.S. PATENT DOCUMENTS

| 10,650,358 | B1* | 5/2020 | Edwards | G06Q 30/012 |
| 2009/0248557 | A1* | 10/2009 | Reed | G06Q 30/02 705/35 |

(Continued)

FOREIGN PATENT DOCUMENTS

CN 105843964 A * 8/2016

OTHER PUBLICATIONS

Get Your Factas Straight: The Application of Facta's Truncation Provision to Online Transactions Sayles, Rebecca J (Year: 2012).*

*Primary Examiner* — William E Rankins
(74) *Attorney, Agent, or Firm* — Bookoff McAndrews, PLLC

(57) ABSTRACT

Disclosed are systems and methods for using a transaction to collect additional transaction information. The method may include: receiving transaction information indicating that a transaction of one or more products and/or services has been made by a user from a merchant; when the transaction information is received, scanning a user e-mail account to identify a receipt for the transaction within an e-mail of the user e-mail account, wherein the receipt is indicative of a transaction price; when the receipt for the transaction is identified: extracting information of the one or more products and/or services from the receipt; and based on the extracted information, automatically generating and submitting a price adjustment claim for the one or more products and/or services when a price lower than the transaction price is found; and when the receipt for the transaction cannot be identified: automatically submitting information about a missing receipt to a fraud system.

20 Claims, 4 Drawing Sheets

(51) Int. Cl.
*G06Q 10/107* (2023.01)
*G06Q 30/018* (2023.01)
*G06Q 30/0234* (2023.01)
*G06Q 40/02* (2023.01)
*G06Q 20/34* (2012.01)

(52) U.S. Cl.
CPC ......... *G06Q 30/0234* (2013.01); *G06Q 40/02* (2013.01); *G06Q 20/342* (2013.01); *G06Q 20/347* (2013.01)

(58) Field of Classification Search
USPC .................................................. 705/1.1, 35
See application file for complete search history.

(56) References Cited

U.S. PATENT DOCUMENTS

| | | |
|---|---|---|
| 2010/0306080 A1 | 12/2010 | Trandal et al. |
| 2014/0067596 A1 | 3/2014 | McGovern et al. |
| 2014/0180872 A1 | 6/2014 | Gura et al. |
| 2014/0214518 A1 | 7/2014 | Hatch et al. |
| 2014/0304059 A1 | 10/2014 | Wang et al. |
| 2015/0127428 A1 | 5/2015 | Gharachorloo et al. |
| 2015/0178792 A1 | 6/2015 | Carr et al. |
| 2015/0379550 A1 | 12/2015 | Warner et al. |
| 2016/0104188 A1 | 4/2016 | Glyman et al. |
| 2016/0217509 A1 | 7/2016 | Eggleston, IV et al. |
| 2018/0189786 A1* | 7/2018 | Poole .................... G06V 30/142 |
| 2018/0218465 A1* | 8/2018 | Lenea .................... G06Q 50/18 |
| 2018/0374171 A1* | 12/2018 | Aizen .................. G06Q 50/167 |

* cited by examiner

SYSTEMS AND METHODS FOR USING A TRANSACTION TO COLLECT ADDITIONAL TRANSACTION INFORMATION

CROSS-REFERENCE TO RELATED APPLICATION(S)

This patent application is a continuation of and claims the benefit of priority to U.S. Nonprovisional patent application Ser. No. 16/880,008, filed on May 21, 2020, the entirety of which is incorporated herein by reference.

TECHNICAL FIELD

Various embodiments of the present disclosure relate generally to collecting transaction information and, more particularly, to systems and methods for using a transaction to collect additional transaction information.

BACKGROUND

Many companies offer various price matching guarantees, rebates, and coupons. Generally, the consumer must find better prices, rebates, and coupons themselves and submit them manually. However, some services may offer price protection services that track prices, rebates, and coupons, and automatically submit price adjustment claims on the user's behalf. Such services may monitor and poll e-mails of the user periodically to find price information of products and/or services purchased by the user. For example, the services may poll a user's e-mails periodically, every hour, every day, every week, etc. However, such periodic and/or constant monitoring may require large amounts of computing resources. Further, there may be a delay in identifying price information for the products due to periodically polling the e-mails.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for using a transaction to collect additional transaction information. Each of the examples disclosed herein may include one or more of the features described in connection with any of the other disclosed examples.

In one embodiment, a computer-implemented method for using a transaction to collect additional transaction information is disclosed. The method may include: receiving, by a processor, transaction information indicating that a transaction of one or more products and/or services has been made by a user from a merchant; when the transaction information is received, scanning, by the processor, a user e-mail account of the user to identify a receipt for the transaction within an e-mail of the user e-mail account, wherein the receipt is indicative of a transaction price; when the receipt for the transaction is identified: extracting, by the processor, information of the one or more products and/or services from the receipt for the transaction; and based on the extracted information, automatically generating and submitting, by the processor, a price adjustment claim for the one or more products and/or services when a price lower than the transaction price for the one or more products and/or services is found by the processor; and when the receipt for the transaction cannot be identified: automatically submitting, by the processor, information about a missing receipt to a fraud system.

In another embodiment, a computer-implemented method for using a transaction to collect additional transaction information is disclosed. The method may include: receiving, by a processor, transaction information indicating that a transaction of one or more products and/or services has been made by a user from a merchant; when the transaction information is received, scanning, by the processor, a user e-mail account of the user to identify, within one or more e-mails, one or more receipts for one or more transactions of one or more products and/or services made by the user, wherein each receipt of the one or more receipts is indicative of a transaction price of a respective one of the one or more transactions; when the one or more receipts is identified: extracting, by the processor, information of the one or more products and/or services from the identified one or more receipts; and based on the extracted information, automatically generating and submitting, by the processor, a price adjustment claim for the one or more products and/or services of the identified one or more receipts when a price lower than the transaction price for the one or more products and/or services is found by the processor; and when the one or more receipts cannot be identified: automatically submitting, by the processor, information about a missing receipt to a fraud system.

In yet another embodiment, a computer-implemented method for using a transaction to collect additional transaction information is disclosed. The method may include: receiving, by a processor, a stream of transaction information including a list of transactions made by a user for one or more products and/or services; when a new transaction of one or more products and/or services made by the user is received in the stream of transaction information, scanning, by the processor, a user e-mail account of the user to identify a receipt for the new transaction and/or identify receipts for other transactions made by the user within one or more e-mails of the user e-mail account, the receipts each including information of one or more products and/or services of a respective transaction made by the user, wherein the receipt is indicative of a transaction price; when a receipt is identified: extracting, by the processor, the information of the one or more products and/or services from the identified receipt; and based on the extracted information, automatically generating and submitting, by the processor, a price adjustment claim for one or more products and/or services in the identified receipt when a price lower than the transaction price for the one or more products and/or services in the identified receipt is found by the processor; and when a receipt for a transaction made by the user can not be identified after a predetermined amount of time: automatically submitting, by the processor, information about a missing receipt to a fraud system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
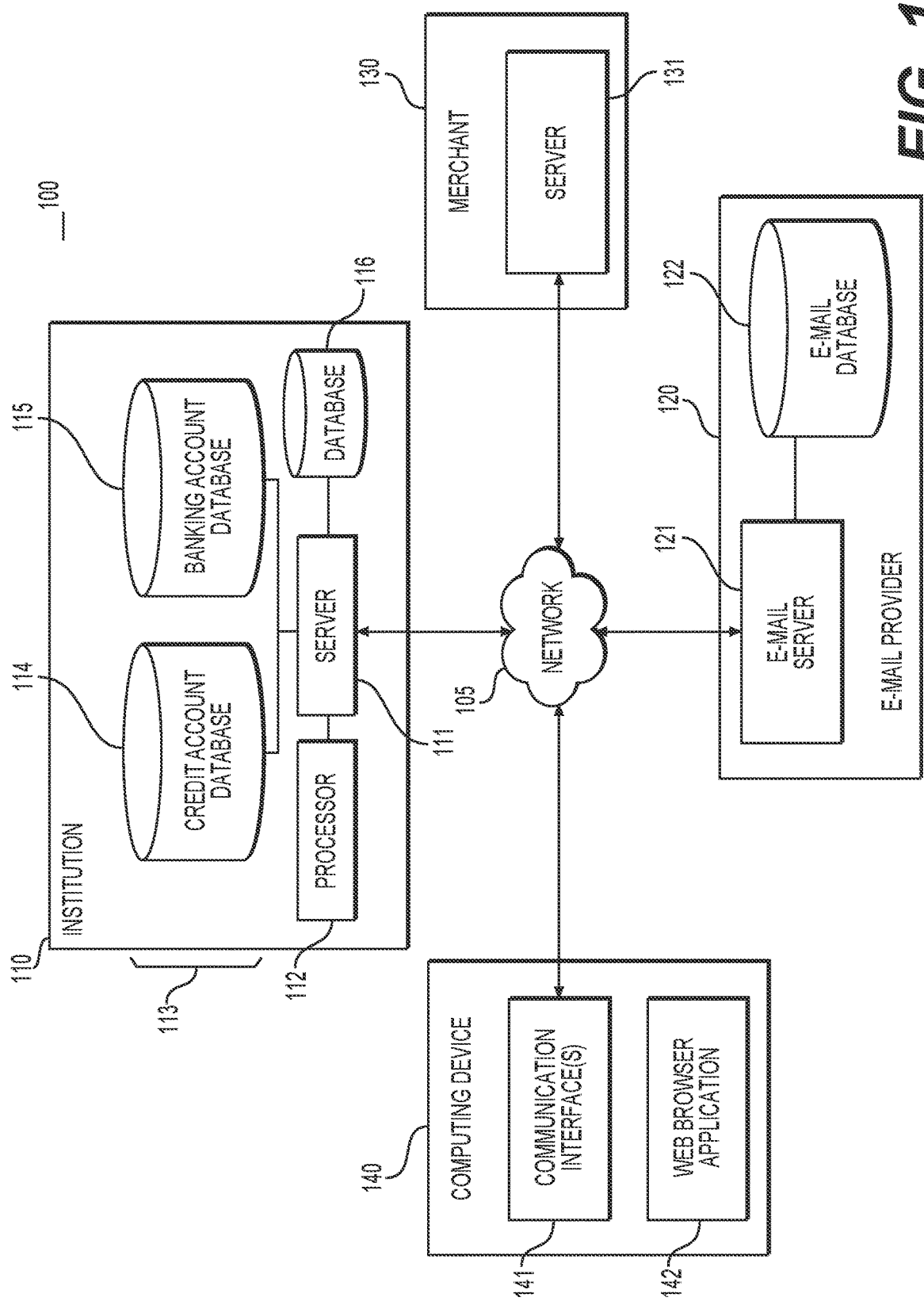
FIG. 1 depicts an exemplary system architecture for using a transaction to collect additional transaction information, according to one or more embodiments.

Various embodiments of the present disclosure relate generally to collecting transaction information and, more particularly, to systems and methods for using a transaction to collect additional transaction information.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides for systems and methods for using a transaction to collect additional transaction information. Embodiments of the disclosure may provide for using a transaction at a merchant as an event to find the e-mail receipt for the transaction in real time. For example, an in-person or online transaction may instantly trigger a check in the user's e-mail account for the relevant receipt. Embodiments may provide for checking the user's e-mail account for just the relevant receipt from the merchant. Embodiments may also provide for checking the user's e-mail account for any receipt from any merchant when a transaction is made by the user. Thus, a transaction may trigger a check of the user's e-mail rather than periodically polling the user's e-mail. Therefore, the systems and methods of the present disclosure may save and/or require less computing resources. Further, the systems and methods of the present disclosure may trigger a check of the user's e-mail in real time, or instantly, when a transaction is made by the user. Thus, the systems and methods may identify price information for the products and/or services quickly and may allow the system to track pricing information sooner. The system may also automatically submit a price adjustment claim using the pricing information and/or may automatically submit a missing receipt claim if a receipt or pricing information is not found. Accordingly, the systems and methods of the present disclosure may enhance user experience by providing real time price protection, while saving or requiring less computing resources.

FIG. 1 is a diagram depicting an exemplary system environment 100 for using a transaction to collect additional transaction information, according to embodiments of the present disclosure. As shown in FIG. 1, system environment 100 may include institution 110 (e.g., a financial service(s) provider) having one or more server systems 111 (e.g., financial service(s) provider server systems) and one or more databases, such as user account databases 113 and institution database 116. Server system 111 may include computing systems, such as system 400 described with respect to FIG. 4. As such, server system 111 may include one or more processors and a memory for storing and executing applications or software modules of system environment 100. For example, server system 111 may include one or more software modules to communicate with user devices and/or other servers through a network 105, such as the Internet. It is understood that network 105 may include any type of network, such as, for example, public networks, local networks, or combinations of public networks and local networks. Further, the one or more processors may be configured to access the memory and execute processor-readable instructions, which when executed by the processor configures the processor to perform a plurality of functions of the system environment 100. For example, the one or more processors may include one or more processors 112 for using a transaction to collect additional transaction information, as detailed further below.

User account databases 113 may include one or more databases of institution 110 and may include credit account database 114 and banking account database 115. Credit account database 114 and banking account database 115 may be provided in a shared database (e.g., a single database) or as one or more separate databases. Databases 114, 115 may store industry information including credit usage information (via credit account database 114) or banking information (via banking account database 115). Specifically, credit account database 114 may store data representative of the purchase history of a user having one or more credit and/or banking accounts. The purchase history of the user may include transaction information of transactions made by the user at one or more merchants 130. For example, the transaction information may include information of the merchant 130, a payment method used for the transaction, and/or a transaction price for the transaction, as detailed further below. Banking account database 115 may store similar data that is obtained from a banking account of the user when, for example, a bank account debit card is used to make a purchase. Databases 114, 115 may also store data representative of the purchase history (e.g., transaction information) of other users having one or more credit and/or banking accounts. The user account databases 113 may further include a stream of transaction information of the user. For example, the stream of transaction information may include a list of transactions made by the user. The list of transactions may include the transaction information for each transaction made by the user.

Institution database 116 may include one or more databases of institution 110 for storing additional information of the user. For example, database 116 may store information of user accounts associated with the user. The user accounts may include one or more e-mail accounts associated with the user, one or more user accounts for merchants 130 and/or one or more user accounts for a third-party marketplace. For example, the user accounts for merchants 130 may include a J-Crew® account and the user account for the third-party marketplace may include an Amazon® account. Processor 112 may also store information of the one or more products and/or services in database 116, as detailed further below. The information of the one or more products and/or services may include, for example, item identifier (ID), price, size, color, product uniform resource locator (URL), description of the service, or any other information about the products and/or services.

An e-mail provider 120 may also be in communication with network 105. E-mail provider 120 may include one or more server systems 121. Server system 121 may include computing systems, such as system 400 described with respect to FIG. 4. As such, server system 121 may include one or more processors and a memory for storing and executing applications or software modules of system environment 100. For example, server system 121 may include one or more software modules to communicate with user devices and/or other servers through network 105. E-mail provider 120 may receive, store, and distribute e-mails to users via server system 121. For example, e-mail provider 120 may receive e-mails through network 105 and store e-mails on a memory or a database 122 of server system 121. E-mail provider 120 may include one or more databases 122 in communication with server system 121 for storing e-mails. Server system 121 may include one or more user e-mail accounts associated with one or more users. E-mails may be stored in the one or more databases based on the user e-mails accounts associated with the e-mails. E-mail provider 120 may notify users when new e-mails are received at a respective user e-mail account. Server system 111 of institution 110 may access e-mails of e-mail provider 120 through network 105, as detailed further below.

System environment 100 may also include one or more merchants 130 each having one or more server systems 131. As used herein, a merchant is a person or company that trades in commodities, such as products and/or services. Further, while a single merchant 130 is depicted in FIG. 1, it is understood that merchant 130 may include any number or various types of merchants. By way of non-limited example, merchant 130 may include a retailer, a third-party marketplace, a hotel, an airline, or any other entity that provides goods, products, and/or services. Merchant 130 may include physical locations, such as stores, and/or may include online locations, such as a website, for selling/providing goods, products, and/or services.

Users, or customers, may transact with merchant 130. For example, customers may purchase one or more products and/or services from merchant 130. Processor 112 may receive transaction information of a respective transaction made by a user from merchant 130. For example, the transaction information may include a payment method associated with the user. As used herein, a payment method may include a method that a buyer (e.g., the user) chooses to compensate a seller (e.g., merchant 130) of a product and/or service that is also acceptable to the seller. Payment methods may include, for example, but not limited to, a credit card, a debit card, a banking account, a prepaid card, and/or an online payment service associated with the user. The online payment service may include, for example, PayPal®, Zelle®, or the like. The transaction information may be sent to server system 111 (e.g., via processor 112) and may be stored in the user account databases 114, 115 associated with the user. The transaction information received from merchant 130 for the transaction may be added to the stream of transactions in the user account databases 114, 115.

When the user transacts with merchant 130, the merchant 130, or a third-party, may generate and send an e-mail to the user confirming the transaction. For example, when a transaction is completed with merchant 130, merchant 130 may generate an e-mail including a receipt for the transaction, and the e-mail may be sent to e-mail provider 120. Processor 112 may scan the user e-mail account to identify the receipt for the transactions within the received e-mail, as detailed further below.

As further shown in FIG. 1, system environment 100 may include user devices, such as, for example, a computing device 140. Computing device 140 may be in communication with server system 111, server 121, and/or server 131 via network 105. Computing device 140 may be a computer system, such as a computer, a mobile computer, or a cellular phone, that is operated by a user. Computing device 140 may include a memory, one or more processors, communication interfaces, input devices, and output devices, as detailed further below with reference to FIG. 4. Computing device 140 may include one or more communication interfaces 141, and a web browser application 142. Communication interface 141 may include one or more cellular radios, Bluetooth, WiFi, near-field communication radios, or other appropriate communication devices for transmitting and receiving information. As can be seen in FIG. 1, communication interface 141 facilitates communication between computing device 140 and network 105. Multiple communication interfaces 141 may be included in user computing device 140 for providing multiple forms of communication between user computing device 140 and server system 111 via network 105. For example, communication may be achieved with network 105 through wireless communication (e.g., WiFi, radio communication, etc.) and/or a wired data connection (e.g., a universal serial bus, an onboard diagnostic system, etc.) or other communication modes.

Web browser application 142 may provide an interface for accessing websites through network 105 (e.g., the Internet). Web browser application 142 may include, for example, Internet Explorer®, Chrome®, Safari®, Edge®, or any other web browser known in the art. Web browser application 142 may display a user interface including websites, such as, for example, a website of merchant 130. The user may transact with merchant 130 via the website on web browser application 142 through network 105. Web browser application 142 may also provide an interface for accessing the user e-mail account of the user. For example, the user may access their user e-mail account on web browser application 142 through network 105. It is understood that web browser application 142 may include any type of application (e.g., a mobile application), such as third-party applications provided by merchants 130, for transacting with the merchant 130.

The user may register for a price adjustment claim service provided by institution 110. For example, the user may use web browser application 142 to access a website for the service to register for the service. Registering for the price adjustment claim service, the user may provide access to one or more user e-mail accounts associated with the user, a user account associated with the user for the merchant 130, and/or a user account associated with the user for a third-party marketplace. For example, the user may provide the user's e-mail address and password and/or a username and password for the user accounts and the information may be stored in database 116. Once the user registers for the service, processor 112 may access the user e-mail account and/or the user accounts associated with the user to scan the user e-mail account and/or the user accounts for receipts for transactions made by the user, as detailed further below.

Figure 2:
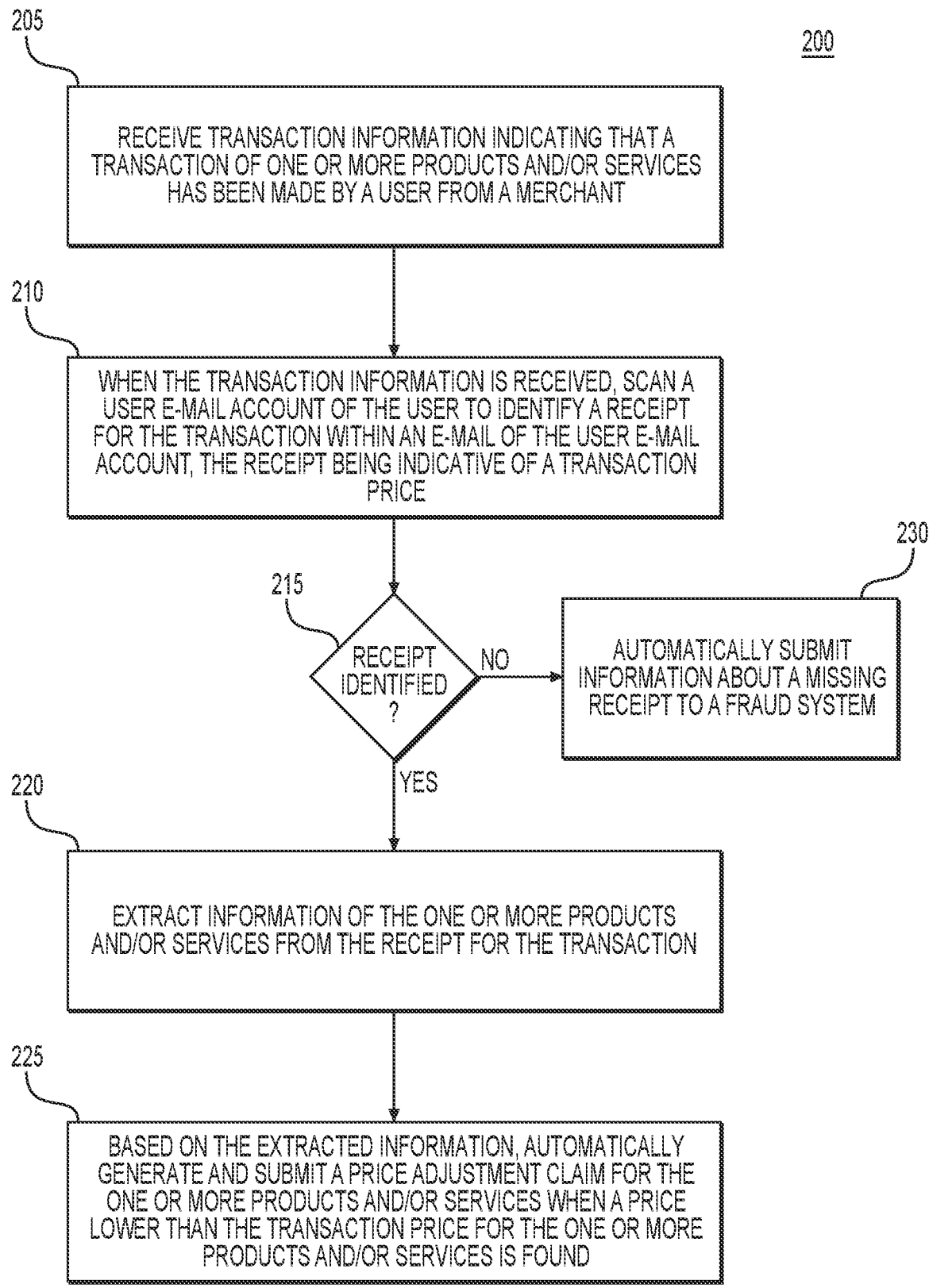
FIG. 2 depicts a flowchart of an exemplary method for using a transaction to collect additional transaction information.

FIG. 2 depicts a flowchart of an exemplary method 200 for using a transaction to collect additional transaction information, according to one embodiment. In an initial step 205, processor 112 may receive transaction information indicating that a transaction of one or more products and/or services has been made by a user from a merchant 130. For example, processor 112 may receive the transaction information directly from merchant 130, or from a third-party. The transaction information may be stored in databases 113 and the processor 112 may access databases 113 to receive the transaction information. The transaction information may include the payment method associated with the user. For example, the payment method may include a credit card, a debit card, a banking account, a prepaid card, and/or an online payment service associated with the user. The user may swipe, tap, or otherwise communicate (e.g., wireless communication, such as, for example, near-field communication) a credit card and/or debit card on a transaction vehicle associated with merchant 130. The transaction vehicle may include, for example, a credit card reader. In some embodiments, the user may transact with merchant 130 via a website associated with merchant 130. Accordingly, processor 112 may receive the transaction information via the website in an online transaction. In some embodiments, the user may transact with the merchant 130 via an application, such as a mobile application for computing device 140, and processor 112 may receive the transaction information from the application. In some embodiments, processor 112 may receive a stream of transactions information including a list of transactions associated with the user. For example, the processor 112 may receive a stream of credit card transactions made by the user from user account databases 113. The transaction information for the one or more products and/or services may be included in the list of transactions.

In step 210, processor 112 may scan the user e-mail account of the user to identify a receipt for the transaction within an e-mail of the user e-mail account. The receipt may be indicative of a transaction price for the one or more products and/or services. The scan may include scanning e-mail metadata and/or the body of the e-mail for an e-mail address, the words "order," "invoice," or "receipt," the format of the subject, dollar signs or other currency signs in the e-mail body, or any other indicators that an e-mail may contain a receipt for the transaction. It is understood that any suitable information to identify a receipt for the transaction may be used.

In some instances, a merchant 130 may not provide itemized receipts via e-mail. However, processor 112 may still identify the transaction price for the one or more products and/or services. In this case, processor 112 may receive user account information associated with the user for an account with the merchant 130. The merchant 130 may provide a summary of transactions made by the user via the user account. For example, when the user has a user account with the merchant 130 and transacts with the merchant 130, processor 112 may receive transaction information (e.g., transaction price for the one or more products and/or services) from merchant 130 via the user account.

In step 215, processor 112 may determine if a receipt for the transaction is identified. When the receipt for the transaction is identified (step 215: YES), processor 112 may extract information of the one or more products and/or services from the receipt for the transaction (step 220). Processor 112 may parse, scan, and classify the receipt using, for example, Xpath and/or optical character recognition (OCR) to extract the information from the receipt. The information of the one or more products and/or services may include, for example, item identifier (ID), price, size, color, product uniform resource locator (URL), or any other information about the products and/or services in the receipt for the transaction. In some instances, some of the information of the one or more products and/or services may not be included in the receipt. In these instances, processor 112 may use available metadata to map the product to an appropriate URL for the product and/or service on the merchant's website. For example, processor 112 may use metadata from the URL for the product and/or service to identify and extract the information of the one or more products. Processor 112 may store the extracted information in database 116. In some embodiments, when a new transaction of one or more products and/or services is contained in the stream of transactions, processor 112 may scan the user e-mail account of the user to identify the receipt for the new transaction within an e-mail of the user e-mail account.

In one embodiment, processor 112 may scan the user e-mail account only when the transaction information is received. For example, receiving the transaction information may trigger processor 112 to scan the user e-mail account. In one embodiment, when the transaction information is received, processor 112 may scan the user e-mail account of the user to identify one or more receipts for other transactions from any merchant within one or more other e-mails of the user e-mail account. For example, receiving the transaction information may trigger processor 112 to scan the user e-mail account for any receipts for any transaction associated with the user. In one embodiment, processor 112 may scan the user e-mail account from a current time to a time of a previous scan. For example, the processor 112 may begin the scan at the time the processor 112 receives the transaction information to the time of the previous scan.

In one embodiment, processor 112 may use only certain types, or predetermined types, of merchants 130 and/or certain types, or predetermined types, of products and/or services to trigger a scan. For example, the processor 112 may scan the user e-mail account when transaction information is received from merchants 130 that have an agreement with institution 110 to allow price adjustment claims to be submitted. In some embodiments, processor 112 may scan the user e-mail account when transaction information is received from merchants 130 that sell certain types of products and/or services.

In step 225, processor 112 may automatically generate and submit a price adjustment claim for the one or more products and/or services when a price lower than the transaction price for the one or more products and/or services is found by the processor 112. After processor 112 has extracted the information of the one or more products and/or services, processor 112 may track prices for the one or more products and/or services in the receipt for the transaction. For example, processor 112 may access various websites through network 105 for pricing information to determine pricing and coupons of the one or more products and/or services in the receipt for the transaction. When a price or prices lower than the transaction price is found, processor 112 may determine whether the product and/or service is eligible for a price drop claim, coupon claim, and/or a price match claim. If the product and/or service is eligible, processor 112 may generate and submit the price adjustment claim. For example, claims may be generated using web forms, web chat, e-mail, or the like. Processor 112 may utilize templates for each of the various claim types (e.g., price drop claim, coupon claim, or price match claim) and/or for each merchant 130.

In step 230, when the receipt for the transaction cannot be identified (step 215: NO), processor 112 may automatically submit information about a missing receipt to a fraud system. For example, institution 110 may include a fraud system for submitting fraud claims of potential fraudulent purchases made with a user account associated with the user (e.g., credit card, debit card, and/or banking account). When processor 112 cannot identify a receipt for the transaction or identify the transaction price or other information for the one or more products and/or services, processor 112 may submit missing receipt information to the fraud system. In some embodiments, processor 112 may submit the information about the missing receipt to the fraud system after a predetermined amount of time. For example, processor 112 may submit the information about the missing receipt if the receipt for the transaction cannot be identified after three days. In some embodiments, processor 112 may submit the information about the missing receipt after a predetermined number of scans. For example, processor 112 may submit the information about the missing receipt when the receipt for the transaction cannot be identified after five scans. It is understood that any amount of time and/or any number of scans may be used and that a combination of a predetermined amount of time and a predetermined number of scans may be used.

Figure 3:
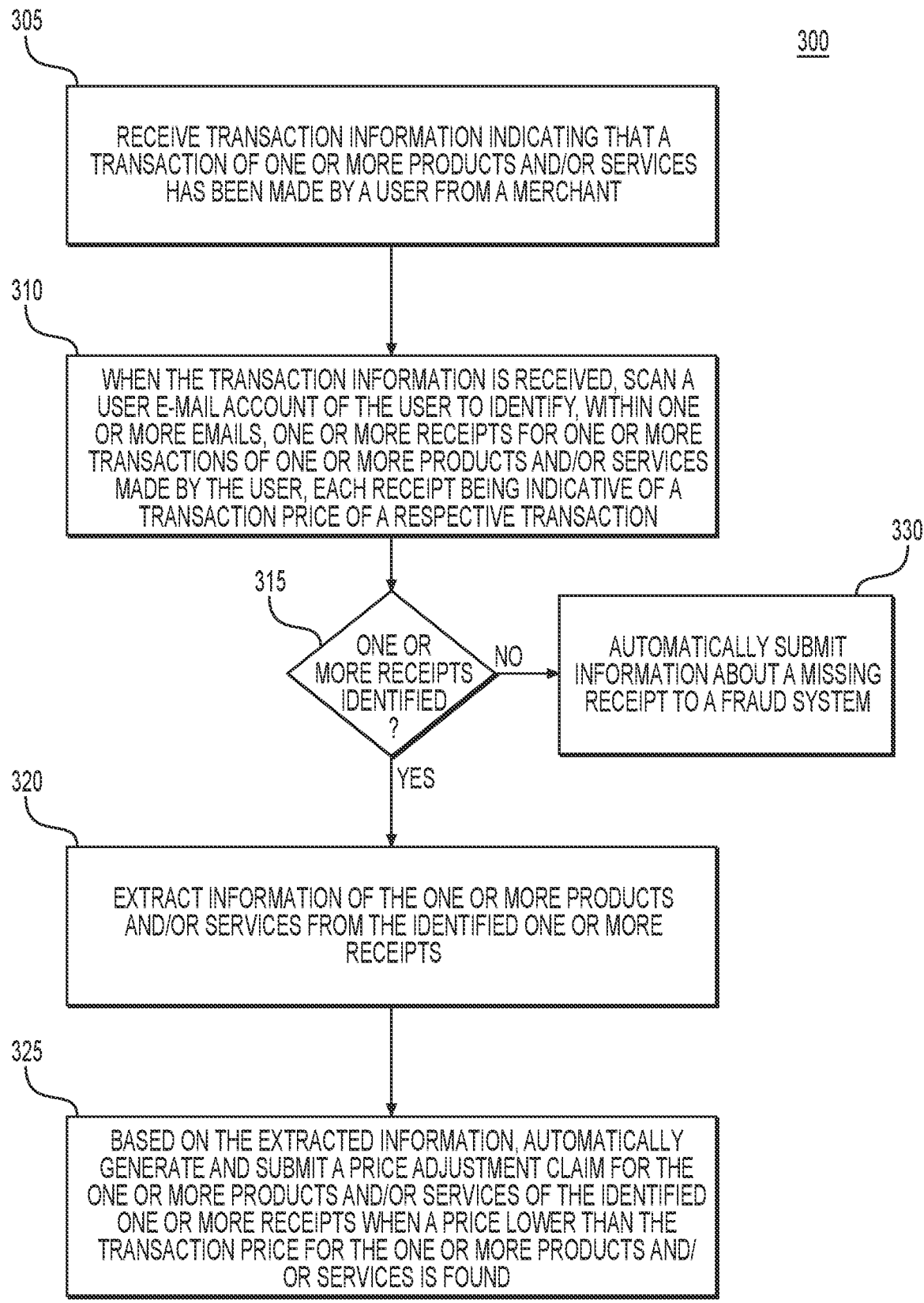
FIG. 3 depicts a flowchart of another exemplary method for using a transaction to collect additional transaction information.

FIG. 3 depicts a flowchart of an exemplary method 300 for using a transaction to collect additional transaction information, according to one or more embodiments, and may be performed in the exemplary system environment 100 of FIG. 1. In an initial step 305, processor 112 may receive transaction information indicating that a transaction of one or more products and/or services has been made by a user from a merchant 130. For example, processor 112 may receive the transaction information directly from merchant 130, or from a third-party. The transaction information may be stored in databases 113 and the processor 112 may access databases 113 to receive the transaction information. The transaction information may include the payment method associated with the user. For example, the payment method may include a credit card, a debit card, a banking account, a prepaid card, and/or an online payment service associated with the user. The user may swipe, tap, or otherwise communicate a credit card and/or debit card on a transaction vehicle associated with merchant 130. The transaction vehicle may include, for example, a credit card reader. In some embodiments, the user may transact with merchant 130 via a website associated with merchant 130. Accordingly, processor 112 may receive the transaction information via the website in an online transaction. In some embodiments, the user may transact with the merchant 130 via an application, such as a mobile application for computing device 140, and processor 112 may receive the transaction information from the application. In some embodiments, processor 112 may receive a stream of transactions information including a list of transactions associated with the user. For example, the processor 112 may receive a stream of credit card transactions made by the user from user account databases 113. The transaction information for the one or more products and/or services may be included in the list of transactions.

In step 310, processor 112 may scan the user e-mail account of the user to identify, within one or more e-mails, one or more receipts for one or more transactions of one or more products and/or services made by the user. For example, processor 112 may scan the user e-mail account for any receipt associated with any transaction of one or more products and/or services made by the user when a new transaction is received. The scan may include scanning the e-mail account from a time period of a most recent previous scan. Thus, when a new transaction is received, processor 112 may scan the user e-mail account to identify one or more receipts of any transaction since a previous scan has been performed.

Each receipt may be indicative of a transaction price for the one or more products and/or services of a respective transaction. The scan may include scanning e-mail metadata and/or the body of the e-mails for an e-mail address, the words "order" or "receipt," the format of the subject, dollar signs or other currency signs in the e-mail body, or any other indicators that an e-mail may contain a receipt for the transaction. It is understood that any suitable information to identify receipts within the e-mails may be used.

In some instances, a merchant 130 may not provide itemized receipts via e-mail. However, processor 112 may still identify the transaction price for the one or more products and/or services of the respective transactions. In this case, processor 112 may receive user account information associated with the user for an account with a respective merchant 130. The merchant 130 may provide a summary of transactions made by the user via the user account. For example, when the user has a user account with the merchant 130 and transacts with the merchant 130, processor 112 may receive transaction information (e.g., transaction price for the one or more products and/or services) from merchant 130 via the user account.

In step 315, processor 112 may determine if one or more receipts are identified. When one or more receipts are identified (step 315: YES), processor 112 may extract information of the one or more products and/or services from the identified one or more receipts (step 320). Processor 112 may parse, scan, and classify the identified receipts using, for example, Xpath and/or optical character recognition (OCR) to extract the information from the receipts. The information of the one or more products and/or services may include, for example, item identifier (ID), price, size, color, product uniform resource locator (URL), or any other information about the products and/or services in the receipt for the transaction. Processor 112 may store the extracted information in database 116. In some embodiments, when a new transaction of one or more products and/or services is contained in the stream of transactions, processor 112 may scan the user e-mail account of the user to identify the one or more receipts within an e-mail of the user e-mail account.

In one embodiment, processor 112 may scan the user e-mail account only when the transaction information is received. For example, receiving the transaction information may trigger processor 112 to scan the user e-mail account. In one embodiment, processor 112 may scan the user e-mail account from a current time to a time of a previous scan. For example, the processor 112 may begin the scan at the time the processor 112 receives the transaction information to the time of the previous scan.

In one embodiment, processor 112 may use only certain types, or predetermined types, of merchants 130 and/or certain types, or predetermined types, of products and/or services to trigger a scan. For example, the processor 112 may scan the user e-mail account when transaction information is received from merchants 130 that have an agreement with institution 110 to allow price adjustment claims to be submitted. In some embodiments, processor 112 may scan the user e-mail account when transaction information is received from merchants 130 that sell certain types of products and/or services.

In step 325, processor 112 may automatically generate and submit a price adjustment claim for the one or more products and/or services of the identified receipts when a price lower than the transaction price for the one or more products and/or services is found by the processor 112. After processor 112 has extracted the information of the one or more products and/or services, processor 112 may track prices for the one or more products and/or services in the receipts. For example, processor 112 may access various websites through network 105 for pricing information to determine pricing and coupons of the one or more products and/or services in the receipts. When a price or prices lower than the transaction price is found, processor 112 may determine whether the product and/or service is eligible for a price drop claim, coupon claim, and/or a price match claim. If the product and/or service is eligible, processor 112 may generate and submit the price adjustment claim. For example, claims may be generated using web forms, web chat, e-mail, or the like. Processor 112 may utilize templates for each of the various claim types (e.g., price drop claim, coupon claim, or price match claim) and/or for each merchant 130.

In step 330, when the receipt for the transaction cannot be identified (step 315: NO), processor 112 may automatically submit information about a missing receipt to a fraud system. For example, institution 110 may include a fraud system for submitting fraud claims of potential fraudulent purchases made with a user account associated with the user (e.g., credit card, debit card, and/or banking account). When processor 112 cannot identify a receipt for the transaction or identify the transaction price or other information for the one or more products and/or services, processor 112 may submit missing receipt information to the fraud system. In some embodiments, processor 112 may submit the information about the missing receipt to the fraud system after a predetermined amount of time. For example, processor 112 may submit the information about the missing receipt if the receipt for the transaction cannot be identified after three days. In some embodiments, processor 112 may submit the information about the missing receipt after a predetermined number of scans. For example, processor 112 may submit the information about the missing receipt when the receipt for the transaction cannot be identified after five scans. It is understood that any amount of time and/or any number of scans may be used and that a combination of a predetermined amount of time and a predetermined number of scans may be used.

Figure 4:
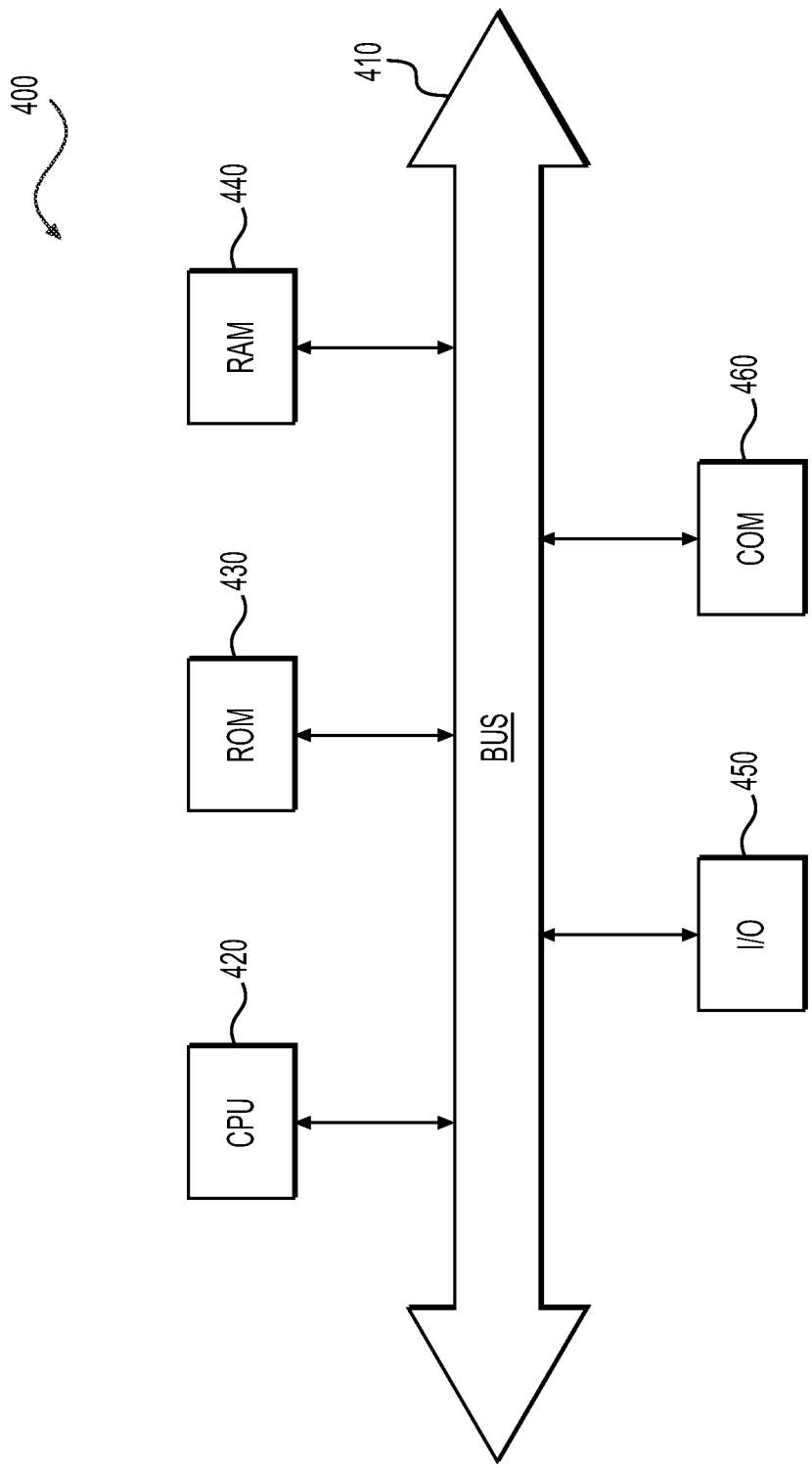
FIG. 4 depicts an example system that may execute techniques presented herein.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 460 for packet data communication. The platform also may include a central processing unit ("CPU") 420, in the form of one or more processors, for executing program instructions. The platform may include an internal communication bus 410, and the platform also may include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for using a transaction to collect additional transaction information, the method comprising:
   receiving, by a processor, transaction information indicating that a transaction of one or more products and/or services has been made by a user from a merchant;
   when the transaction information is received, scanning, by the processor, one or more user accounts of the user to determine whether a transaction price of the transaction and information of the one or more products and/or services are identifiable within at least one of the one or more user accounts, wherein only a portion of information included in the one or more user accounts is scanned, the portion being associated with a time from a time when the transaction information is received to a time of a most recent previous scanning that was performed when previous transaction information was received; and
   in response to identifying the transaction price of the transaction and the information of the one or more products and/or services within the at least one of the one or more user accounts based on the scanning:
      tracking, by the processor, prices for the one or more products and/or services based on the information of the one or more products and/or services; and
      based on the tracked prices, automatically generating and submitting, by the processor, a price adjustment claim for the one or more products and/or services when a price lower than the transaction price of the transaction is found by the processor, or
   in response to failing to identify the transaction price of the transaction and the information of the one or more products and/or services within any of the one or more user accounts based on the scanning, automatically generating and submitting, by the processor, a fraud claim indicating the transaction as a potentially fraudulent transaction.

2. The computer-implemented method of claim 1, wherein the transaction information includes information from a payment method associated with the user.

3. The computer-implemented method of claim 2, wherein the payment method includes at least one of a credit card, a debit card, a banking account, a prepaid card, or an online payment service associated with the user.

4. The computer-implemented method of claim 1, further comprising:
   receiving, by the processor, a stream of transaction information, the stream including a list of transactions associated with the user, wherein the transaction information is contained in the list of transactions associated with the user.

5. The computer-implemented method of claim 4, further comprising:
   when a new transaction of one or more products and/or services is added to the list of transactions in the stream of transactions, scanning, by the processor, the one or more user accounts of the user to identify a transaction price for the new transaction within the one or more user accounts.

6. The computer-implemented method of claim 1, wherein the scanning, by the processor, the one or more user accounts of the user includes scanning the one or more user accounts only when the transaction information is received.

7. The computer-implemented method of claim 1, further comprising:
   when the transaction information is received, scanning, by the processor, the one or more user accounts of the user to identify transaction prices for other transactions from the merchant within the one or more user accounts.

8. The computer-implemented method of claim 1, further comprising:
   when the transaction information is received, scanning, by the processor, the one or more user accounts of the user to identify transaction prices for other transactions from any merchant within the one or more user accounts.

9. The computer-implemented method of claim 1, wherein the one or more user accounts include at least one of an e-mail account, a user account for the merchant, or a user account for a third-party marketplace.

10. The computer-implemented method of claim 1, wherein the price adjustment claim is associated with one or more of a price drop claim, a coupon claim, and a price match claim, and the method further comprises:
    determining the one or more products and/or services are eligible for at least one of the price drop claim, the coupon claim, or the price match claim, wherein the price adjustment claim is automatically generated and submitted further based on the determination.

11. The computer-implemented method of claim 1, wherein the receiving, by the processor, the transaction information includes receiving, by the processor, the transaction information from at least one of a transaction vehicle, an application, or an online transaction, associated with the merchant.

12. A computer system for using a transaction to collect additional transaction information, comprising:
- at least one memory having processor-readable instructions stored therein; and
- at least one processor configured to access the at least one memory and execute the processor-readable instructions, which when executed by the at least one processor configures the at least one processor to perform a plurality of functions, including functions for:
  - receiving transaction information indicating that a transaction of one or more products and/or services has been made by a user from a merchant;
  - when the transaction information is received, scanning one or more user accounts of the user to determine whether one or more transaction prices for one or more transactions of one or more products and/or services made by the user are identifiable within the one or more user accounts, including at least a transaction price for the transaction for which the transaction information is received, wherein only a portion of information included in the one or more user accounts is scanned, the portion being associated with a time from a time when the transaction information is received to a time of a most recent previous scanning that was performed when previous transaction information was received;
  - for each of the one or more transactions of the one or more products and/or services made by the user having a respective transaction price identified within at least one of the one or more user accounts based on the scanning:
    - tracking prices for the one or more products and/or services; and
    - based on the tracked prices, automatically generating and submitting a price adjustment claim for the one or more products and/or services when a price lower than the respective transaction price for the one or more products and/or services is found by the at least one processor; and
  - for each of the one or more transactions of the one or more products and/or services made by the user having a respective transaction price that is not identified within any of the one or more user accounts based on the scanning, automatically generating and submitting a fraud claim indicating the respective transaction as a potentially fraudulent transaction.

13. The computer system of claim 12, wherein the transaction information includes information from a payment method associated with the user.

14. The computer system of claim 13, wherein the payment method includes at least one of a credit card, a debit card, a banking account, a prepaid card, or an online payment service associated with the user.

15. The computer system of claim 12, further comprising:
- receiving a stream of transaction information, the stream including a list of transactions associated with the user, wherein the transaction information is contained in the list of transactions associated with the user.

16. The computer system of claim 15, further comprising:
- when a new transaction of one or more products and/or services is added to the list of transactions in the stream of transactions, scanning the one or more user accounts of the user to identify, within the one or more accounts, one or more transaction prices for one or more transactions of one or more products and/or services made by the user.

17. The computer system of claim 12, wherein the scanning the one or more user accounts of the user includes scanning the one or more user accounts only when the transaction information is received.

18. The computer system of claim 12, wherein the receiving the transaction information indicating that a transaction of one or more products and/or services has been made by the user from a merchant includes receiving the transaction information from a predetermined type of merchant, and
- wherein the scanning the one or more user accounts of the user includes scanning the one or more user accounts of the user when the transaction information is received from the predetermined type of merchant.

19. The computer system of claim 12, wherein the receiving the transaction information includes receiving the transaction information from at least one of a transaction vehicle, an application, or an online transaction associated with the merchant.

20. A computer-implemented method for using a transaction to collect additional transaction information, the method comprising:
- receiving, by a processor, a stream of transaction information including a list of transactions made by a user for one or more products and/or services from a payment method associated with the user;
- when a new transaction of one or more products and/or services made by the user is received and added to the list of transactions, scanning, by the processor, one or more user accounts of the user to determine whether a transaction price for the new transaction and/or transaction prices for other transactions within the list of transactions made by the user are identifiable within at least one of the one or more user accounts, wherein only a portion of information included in the one or more user accounts is scanned, the portion being associated with a time from a time when the new transaction is received to a time of a most recent previous scanning that was performed when a previous transaction was received; and
- in response to identifying the transaction price for the new transaction and/or one or more of the transaction prices for one or more of the other transactions within at least one of the one or more user accounts based on the scanning, for each of the new transaction and/or the one or more of the transactions having a respective transaction price identified:
  - tracking, by the processor, prices for the one or more products and/or services; and
  - based on the tracked prices, automatically generating and submitting, by the processor, a price adjustment claim for the one or more products and/or services when a price lower than the respective transaction price for the one or more products and/or services is found by the processor; or
- in response to failing to identify the transaction price for the new transaction and/or the one or more of the transaction prices for the one or more of the other transactions within any of the one or more user accounts based on the scanning, for each of the new transaction and/or the one or more of the transactions not having a respective transaction price identified, automatically generating and submitting a fraud claim indicating the respective transaction as a potentially fraudulent transaction.

* * * * *